(12) United States Patent
Nishizawa

(10) Patent No.: US 11,347,178 B2
(45) Date of Patent: May 31, 2022

(54) IMAGE READING APPARATUS AND IMAGE FORMING APPARATUS

(71) Applicant: CANON KABUSHIKI KAISHA, Tokyo (JP)

(72) Inventor: Seiji Nishizawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 534 days.

(21) Appl. No.: 16/291,199

(22) Filed: Mar. 4, 2019

(65) Prior Publication Data

US 2019/0302675 A1    Oct. 3, 2019

(30) Foreign Application Priority Data

Mar. 28, 2018    (JP) .............................. JP2018-062948

(51) Int. Cl.
*H04N 1/04* (2006.01)
*G03G 21/16* (2006.01)
(Continued)

(52) U.S. Cl.
CPC ......... *G03G 21/1633* (2013.01); *B65H 5/064* (2013.01); *B65H 7/20* (2013.01);
(Continued)

(58) Field of Classification Search
None
See application file for complete search history.

(56) References Cited

U.S. PATENT DOCUMENTS 6,615,019 B2    9/2003    Fujimoto
7,724,405 B2 *  5/2010    Kondo ............... H04N 1/00554
                                                          358/487
(Continued)

FOREIGN PATENT DOCUMENTS

CN       1362649 A       8/2002
CN      202495988 U     10/2012
(Continued)

OTHER PUBLICATIONS

Chinese Office Action dated Apr. 30, 2021, in related corresponding Chinese Patent Application No. 201910224975.5 (with English translation).

(Continued)

*Primary Examiner* — Cheukfan Lee
(74) *Attorney, Agent, or Firm* — Venable LLP

(57) ABSTRACT

An image reading apparatus includes a first opening/closing unit to openably and closeably support a sheet conveyance portion with respect to an image reading portion, and a second opening/closing unit to openably and closeably support the sheet conveyance portion with respect to the image reading portion. The first opening/closing unit includes a first spring to urge the sheet conveyance portion in a direction in which the sheet conveyance portion moves from a closed position toward an opened position, and the second opening/closing unit includes a second spring to urge the sheet conveyance portion in the direction in which the sheet conveyance portion moves from the closed position toward the opened position and an oil damper to attenuate vibration energy of the sheet conveyance portion. The first opening/closing unit does not include an oil damper.

9 Claims, 11 Drawing Sheets

(51) Int. Cl.
    *B65H 5/06*     (2006.01)
    *B65H 9/06*     (2006.01)
    *B65H 7/20*     (2006.01)
    *H04N 1/00*     (2006.01)

(52) U.S. Cl.
    CPC .............. *B65H 9/06* (2013.01); *H04N 1/0057* (2013.01); *H04N 1/00551* (2013.01); *H04N 1/00554* (2013.01); *H04N 1/00557* (2013.01); *H04N 1/00559* (2013.01)

(56) References Cited

U.S. PATENT DOCUMENTS

| | | | |
|---|---|---|---|
| 8,983,359 | B2 | 3/2015 | Hirokawa |
| 9,191,542 | B2 | 11/2015 | Urita et al. |
| 9,538,032 | B2 | 1/2017 | Ishizuka et al. |
| 9,657,505 | B2 | 5/2017 | Yonemoto |
| 2006/0158702 | A1* | 7/2006 | Kondo ................ H04N 1/00554 358/498 |
| 2009/0034208 | A1* | 2/2009 | Suzuki ................ G03G 15/605 361/725 |
| 2009/0109504 | A1* | 4/2009 | Hirokawa .......... H04N 1/00554 358/498 |
| 2009/0154974 | A1* | 6/2009 | Katsumata ......... G03G 21/1628 399/380 |
| 2011/0072727 | A1* | 3/2011 | Kumazawa .......... G03G 15/605 49/358 |
| 2016/0057300 | A1* | 2/2016 | Ishizuka ................ H04N 1/028 358/474 |
| 2016/0369544 | A1* | 12/2016 | Yonemoto ........... E05D 11/1064 |
| 2018/0091670 | A1* | 3/2018 | Murodate .......... H04N 1/00554 |
| 2018/0288254 | A1* | 10/2018 | Miura ...................... E05F 5/00 |

FOREIGN PATENT DOCUMENTS

| | | |
|---|---|---|
| CN | 104601851 A | 5/2015 |
| CN | 106257903 A | 12/2016 |
| JP | H07-120845 A | 5/1995 |
| JP | 2006-349022 A | 12/2006 |
| JP | 2009-111728 A | 5/2009 |
| JP | 2013-137555 A | 7/2013 |
| JP | 2016-046681 A | 4/2016 |

OTHER PUBLICATIONS

Chinese Office Action dated Sep. 15, 2021, in related corresponding Chinese Patent Application No. 201910224975.5 (with English translation).

Japanese Office Action dated Jan. 18, 2022, in related corresponding Japanese Patent Application No. 2018-062948.

* cited by examiner

IMAGE READING APPARATUS AND IMAGE FORMING APPARATUS

BACKGROUND OF THE INVENTION

Field of the Invention

The present invention relates to an image reading apparatus that reads an image on a sheet and to an image forming apparatus.

Description of the Related Art

Generally, an auto document feeder that separates one document from documents placed on a document stage and feeds the document to an image reading position is widely used in an image reading apparatus provided in a multifunctional apparatus or the like. The auto document feeder will be simply referred to as an ADF. In addition, the ADF is openably and closeably supported with respect to a document placing plate, and in the case where reading of a document is manually performed without using the ADF, the ADF is first opened by being lifted up, and the document is placed on a platen glass. Then, the ADF is closed, and an image is read in a state in which a document surface of the document is pressed against the platen glass by the ADF.

Conventionally, examples of such an image reading apparatus include one configured such that the ADF is openably and closeably supported with respect to the document placing plate by a pair of hinges respectively provided on the left and on the right. For example, see Japanese Patent laid-open No. H07-120845. The pair of left and right hinges each include a coil spring that applies a spring force to a hinge frame and to a hinge base. In addition, the pair of left and right hinges each include a damper that is provided inside the coil spring and applies a resistance force against a motion of the ADF in a closing direction.

In the case where a coil spring is provided to each of the pair of left and right hinges as described in Japanese Patent laid-open No. H07-120845 mentioned above, an opening motion of the ADF can be assisted by the spring force of the coil spring, and a falling speed of the ADF derived from the weight thereof can be reduced to some extent when closing the ADF. In addition, in the image reading apparatus described in Japanese Patent laid-open No. H07-120845 mentioned above, since an oil damper is provided in each of the pair of left and right hinges, the ADF can quietly land on the platen glass due to this oil damper.

However, the damper described above is an expensive component, and there is a problem that the production cost of the image reading apparatus increases due to the cost of this damper.

SUMMARY OF THE INVENTION

According to a first aspect of the present invention, an image reading apparatus includes a sheet conveyance portion configured to convey a sheet, an image reading portion including a movable portion and an image sensor and configured to read an image on the sheet conveyed by the sheet conveyance portion, the movable portion including a light source and being movable in a predetermined direction, the image sensor being configured to photoelectrically convert reflection light emitted from the light source and reflected on the sheet, and an opening/closing device configured to openably and closeably support the sheet conveyance portion with respect to the image reading portion. The opening/closing device includes a first opening/closing unit and a second opening/closing unit, the first opening/closing unit being provided at, in a movement direction of the movable portion, a position in a first distance from a reading position at which the image on the sheet conveyed by the sheet conveyance portion is read by the image reading portion, the second opening/closing unit being provided at a position in a second distance longer than the first distance from the reading position in the movement direction. The second opening/closing unit includes an attenuation device configured to attenuate vibration energy of the sheet conveyance portion, and the first opening/closing unit does not include an attenuation device.

According to a second aspect of the present invention, an image reading apparatus includes a sheet conveyance portion configured to convey a sheet, an image reading portion including a movable portion and an image sensor and configured to read an image on the sheet conveyed by the sheet conveyance portion, the movable portion including a light source and being movable in a predetermined direction, the image sensor being configured to photoelectrically convert reflection light emitted from the light source and reflected on the sheet, and an opening/closing device configured to openably and closeably support the sheet conveyance portion with respect to the image reading portion. The opening/closing device includes a first opening/closing unit and a second opening/closing unit, the first opening/closing unit being provided at, in a movement direction of the movable portion, a position in a third distance from a position of a center of gravity of the sheet conveyance portion, the second opening/closing unit being provided at a position in a fourth distance longer than the third distance from the position of the center of gravity in the movement direction. The second opening/closing unit includes an attenuation device configured to attenuate vibration energy of the sheet conveyance portion, and the first opening/closing unit does not include an attenuation device.

According to a third aspect of the present invention, an image reading apparatus includes a sheet conveyance portion configured to convey a sheet, an image reading portion including a movable portion and an image sensor and configured to read an image on the sheet conveyed by the sheet conveyance portion, the movable portion including a light source and being movable in a predetermined direction, the image sensor being configured to photoelectrically convert reflection light emitted from the light source and reflected on the sheet, and an opening/closing device configured to openably and closeably support the sheet conveyance portion with respect to the image reading portion. The opening/closing device includes a first opening/closing unit and a second opening/closing unit provided at different positions in a movement direction of the movable portion. The first opening/closing unit includes a first pivot shaft and a first urging member configured to generate a torque in the first pivot shaft and in a direction in which the sheet conveyance portion moves from a closed position toward an opened position. The second opening/closing unit includes a second pivot shaft, a second urging member, and an attenuation device, the second urging member being configured to generate, in the second pivot shaft and in the direction in which the sheet conveyance portion moves from the closed position toward the opened position, a torque smaller than the torque generated by the first urging member, the attenuation device being configured to attenuate vibration energy of the sheet conveyance portion. The first opening/closing unit does not include an attenuation device configured to attenuate vibration energy of the sheet conveyance portion.

Further features of the present invention will become apparent from the following description of exemplary embodiments with reference to the attached drawings.

DESCRIPTION OF THE EMBODIMENTS

Overall Configuration of Printer

Figure 1:
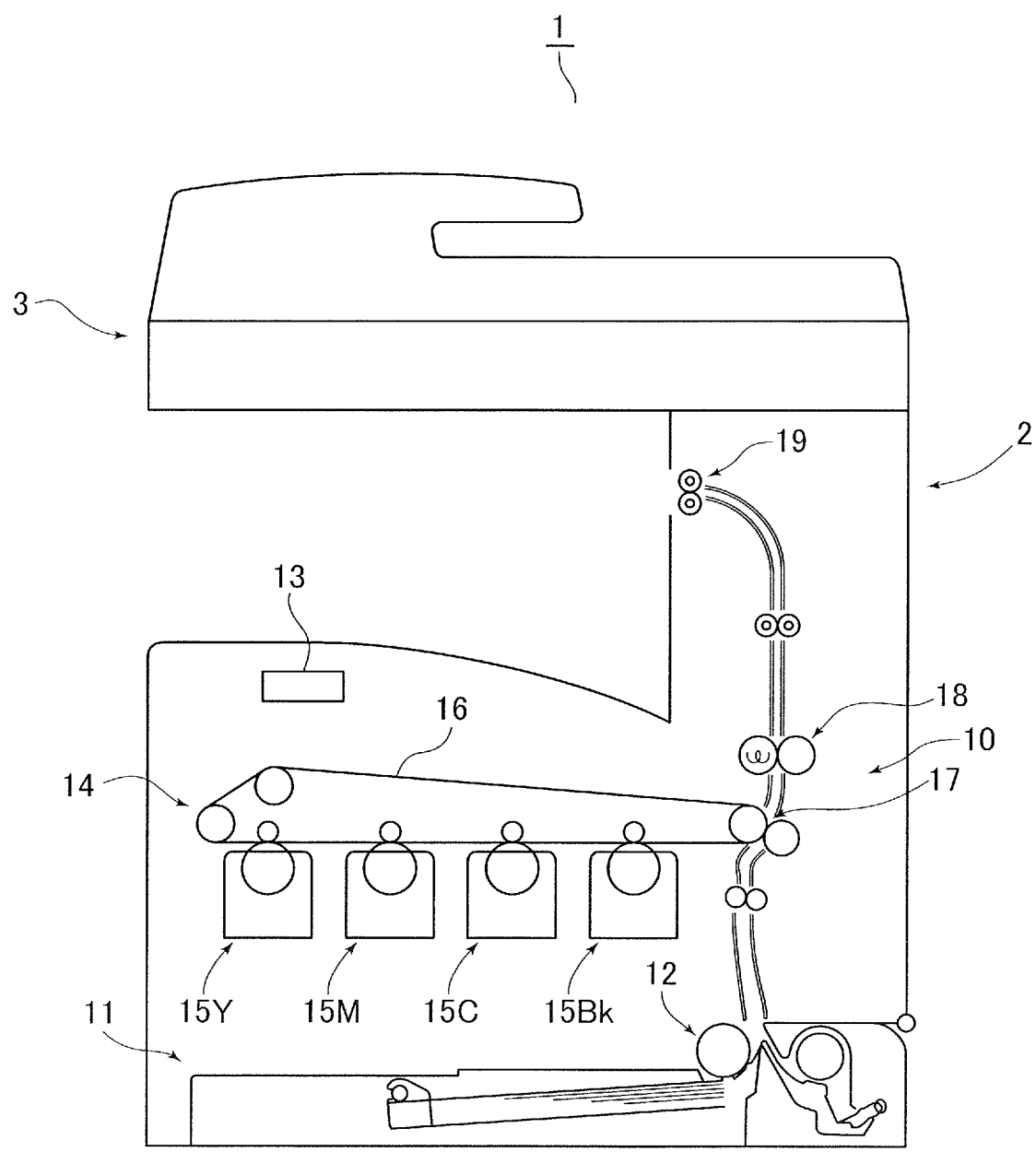
FIG. 1 is a schematic diagram illustrating a printer according to an exemplary embodiment.

Hereinafter, an exemplary embodiment of the present invention will be described with reference to drawings. FIG. 1 illustrates a printer 1 serving as an image forming apparatus according to the present exemplary embodiment. As illustrated in FIG. 1, the printer 1 includes an apparatus body 2 and an image reading apparatus 3 provided in an upper portion of the apparatus body 2, and an image forming portion 10 and a controller 13 that form an image on a sheet is provided in the apparatus body 2.

The image forming portion 10 includes an image forming unit 14 of an electrophotographic system and a fixing unit 18. In the image forming unit 14, image forming units 15Y, 15M, 15C, and 15Bk respectively corresponding to colors of yellow, magenta, cyan, and black are arranged in parallel along an intermediate transfer belt 16 serving as an intermediate transfer member, and perform an image forming operation in accordance with a command from the controller 13. Specifically, when the start of the image forming operation is commanded, in each of the image forming units 15Y to 15Bk, a photosensitive drum serving as a photosensitive member rotates, and the surface of the photosensitive drum is uniformly charged by a charging unit. Then, an exposing unit modulates and outputs laser light on the basis of image data transmitted from the image reading apparatus 3 or an external computer, and thus scans the surface of the photosensitive drum to form an electrostatic latent image. These electrostatic latent images are visualized, that is, developed by toner supplied from developing units, and are sequentially transferred onto the intermediate transfer belt 16 so as to be superimposed on one another.

In addition, a feeding operation of feeding a sheet supported in a sheet cassette 11 or an unillustrated manual feed tray toward a secondary transfer portion 17 of the image forming portion 10 is performed in parallel with the image forming operation described above. The sheet fed by a sheet feeding portion 12 is conveyed to the secondary transfer portion 17 to match progress of the image forming operation of the image forming units 15Y to 15Bk, and a toner image is transferred onto a sheet in this secondary transfer portion 17. The sheet onto which an unfixed toner image has been transferred is passed to the fixing unit 18, nipped by a roller pair, and heated and pressurized. The sheet on which the toner has been melted and adhered and thus an image has been fixed is discharged by a sheet discharge portion 19 such as a discharge roller pair.

Image Reading Apparatus

Next, a configuration of the image reading apparatus 3 will be described in detail. To be noted, in the present exemplary embodiment, examples of the sheet include, in addition to regular paper, special paper such as coated paper, recording materials having special shapes such as envelops and index sheets, plastic films for overhead projectors, and cloths. In addition, a document also serves as an example of the sheet, and the document may be blank, or may have an image on one surface or each surface of the document.

Figure 2:
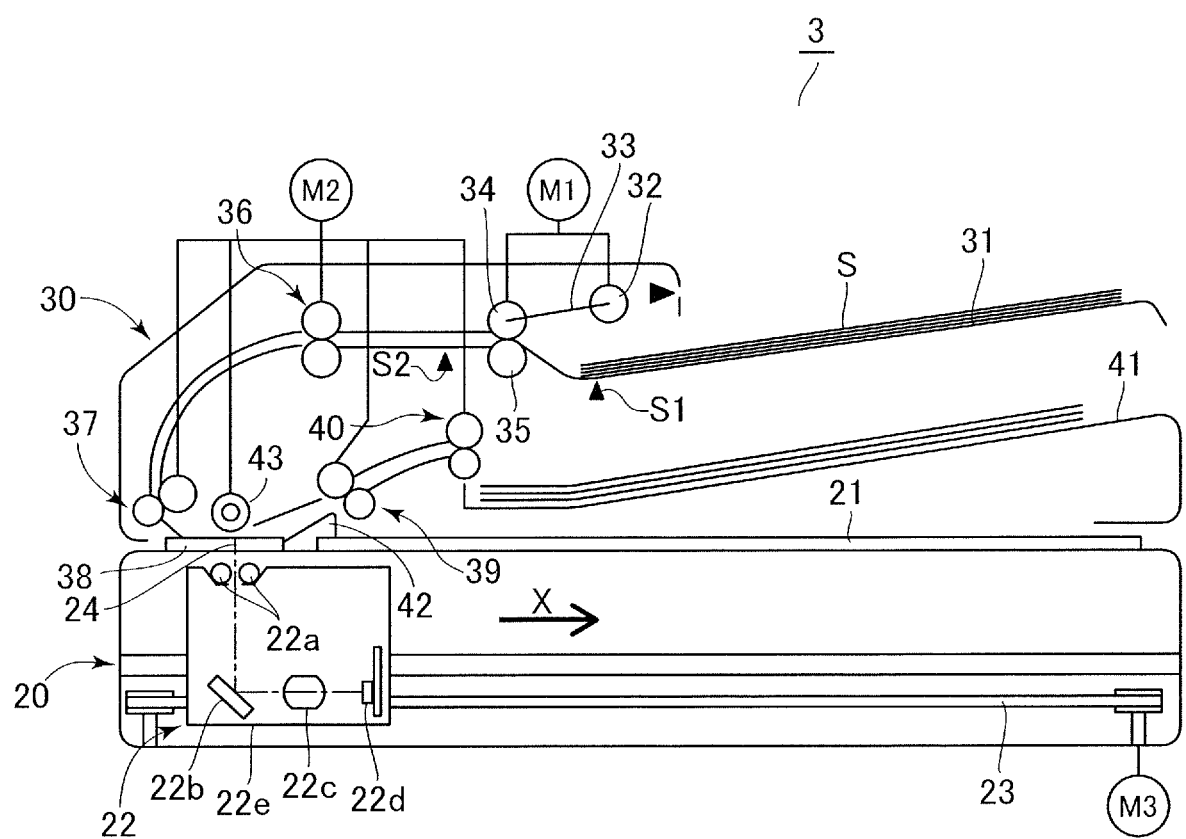
FIG. 2 is a schematic diagram illustrating an image reading apparatus according to the exemplary embodiment.
Figure 3:
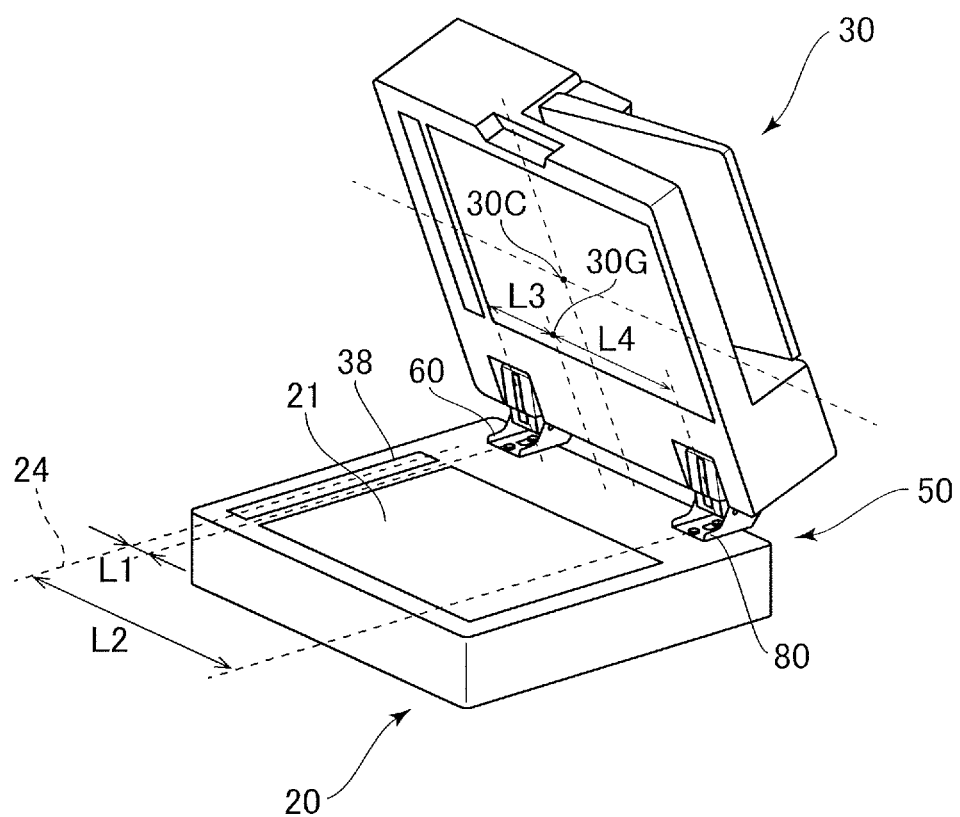
FIG. 3 is a perspective view of the image reading apparatus of FIG. 2.
Figure 3:
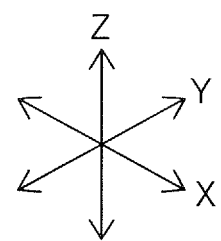

As illustrated in FIG. 2, the image reading apparatus 3 includes an image reading portion 20 that reads an image of a document, and an auto document feeder 30 serving as a sheet conveyance apparatus. Hereinafter, the auto document feeder 30 will be simply referred to as an ADF 30. In addition, the image reading apparatus 3 includes an opening/closing device 50 that openably and closeably supports the ADF 30 with respect to the image reading portion 20. The opening/closing device 50 is illustrated in FIG. 3. The image reading portion 20 includes a platen glass 21 on which a document is to be placed and an optical scanner unit 22 movable in a sub-scanning direction, which is an arrow X direction in FIG. 2, and is configured to be capable of reading the document by two methods called fixed reading and document-feeding reading. In the fixed reading, the image reading portion 20 reads, one line at a time, image information recorded on the document, by scanning the document placed on the platen glass 21 by the optical scanner unit 22 in the sub-scanning direction at a constant speed. In addition, in the document feeding-reading, the optical scanner unit 22 is positioned in a document feeding-reading position in which a reading line is positioned at the center position of a leading roller 43 of the ADF 30, and optically reads a document on a document tray 31 that has been conveyed by the ADF 30. Image data read by the image reading portion 20 is formed as a toner image on a sheet by the image forming portion 10, or output to a computer as image data. To be noted, in the description below, an image reading position at which an image on a sheet, that is, the document, conveyed by the ADF 30 is read by the image reading portion 20 in this document feeding-reading will be referred to as a reading position 24.

More specifically, the image reading portion 20 includes the optical scanner unit 22 described above inside a document stage serving as a body portion thereof, and the optical scanner unit 22 includes a carriage 22e coupled to a driving motor M3 via a timing belt 23. The carriage 22e serving as a movable portion is capable of moving parallel with the platen glass 21, that is, in the sub-scanning direction X serving as a predetermined direction, as a result of the driving motor M3 rotating, and is positioned in the document feeding-reading position when no image is being formed and in the document feeding-reading. In addition, in the fixed reading, the driving motor M3 drives and the carriage 22e moves in the sub-scanning direction X. Further, the carriage 22e includes a light-emitting diode: LED 22a serving as a light source, a mirror 22b, a lens 22c, an image reading sensor 22d serving as an image sensor, and so forth. Reflection light emitted from the light source and reflected on the sheet is led to the image reading sensor 22d via the mirror 22b and the lens 22c, and is subjected to photoelectric conversion by this image reading sensor 22d, and thus an image on the document is read.

In addition, in the present exemplary embodiment, the ADF 30 serves as a sheet conveyance portion configured to convey a sheet. More specifically, the ADF 30 includes the document tray 31 that supports a document bundle S constituted by one or more documents. In addition, the ADF 30 includes a feed roller 32 that feeds a document from the document bundle S supported on the document tray 31, and a pair of separation rollers 34 and 35 positioned downstream of the feed roller 32 in a sheet conveyance direction. The document tray 31 serving as a sheet support portion that supports a sheet includes an optical document presence detection sensor S1 serving as a sheet presence detection portion, and is thus capable of determining whether or not a document is present on the document tray 31. The feed roller 32 is configured to be capable of ascending and descending via an arm 33, and is configured to abut and feed a document on the uppermost surface, that is, the uppermost document in the document bundle S supported on the document tray 31 by descending from a retracting position positioned higher. The feed roller 32 constitutes a sheet feeding portion configured to feed a sheet supported on the sheet support portion, and one document is separated and fed from documents fed by this feed roller 32 by the pair of separation rollers 34 and 35.

The pair of separation rollers 34 and 35 serving as a separation conveyance portion that separates and conveys a document includes a separation conveyance roller 34 and a separation conveyance driven roller 35, and a separation nip is formed by the separation conveyance roller 34 and the separation conveyance driven roller 35. The separation conveyance roller 34 shares a drive source with the feed roller 32, and the feed roller 32 and the separation conveyance roller 34 are rotationally driven as a result of a feed motor M1 rotationally driving. The separation conveyance driven roller 35 is disposed to oppose the separation conveyance roller 34, and is pressed toward the separation conveyance roller 34. In addition, the separation conveyance driven roller 35 is formed from a rubber material or the like having a slightly smaller friction coefficient than the separation conveyance roller 34, and separates and feeds one document from documents fed by the feed roller 32 in cooperation with the separation conveyance roller 34. To be noted, a post-separation sensor S2 is provided downstream of the pair of separation rollers 34 and 35 in the sheet conveyance direction, and the timing at which the document has passed through the separation nip is detected by this post-separation sensor S2.

The document separated by the pair of separation rollers 34 and 35 is conveyed to a registration roller pair 36, and the document abuts the registration roller pair 36 in a still state. As a result of this, loop-shaped warpage is formed in the document, the skew of the document in the conveyance is corrected, and thus the position of the leading end thereof is aligned. A conveyance path to convey the document having passed through the registration roller pair 36 to a document feeding-reading glass 38 is provided downstream of the registration roller pair 36, and the document fed to this conveyance path is conveyed to the reading position 24 by an upstream reading roller pair 37. In the reading position 24, the surface of the document is illuminated by the LED 22a, reflection light thereof is bent by the mirror 22b and led to the image reading sensor 22d via the lens 22c, and a front surface image of the document is read one line at a time.

A downstream reading roller pair 39 is provided downstream of the leading roller 43, disposed to oppose the document feeding-reading glass 38, in a document conveyance direction. A document conveyed by this downstream reading roller pair 39 is discharged onto a discharge tray 41 by a discharge roller pair 40 in the case of reading only the front surface image of the document. In addition, a jump ramp 42 to scoop up a sheet from the document feeding-reading glass 38 is provided between the document feeding-reading glass 38 and the downstream reading roller pair 39. Further, the registration roller pair 36, the upstream reading roller pair 37, the downstream reading roller pair 39, and the discharge roller pair 40 share a drive source, and these roller pairs are rotationally driven as a result of a conveyance motor M2 rotationally driving. In the case where a plurality of documents are placed on the document tray 31, the image reading apparatus 3 repeats the process described above until reading and discharge onto the discharge tray 41 of the last document are finished.

Configuration of Opening/Closing Device

Figure 4:
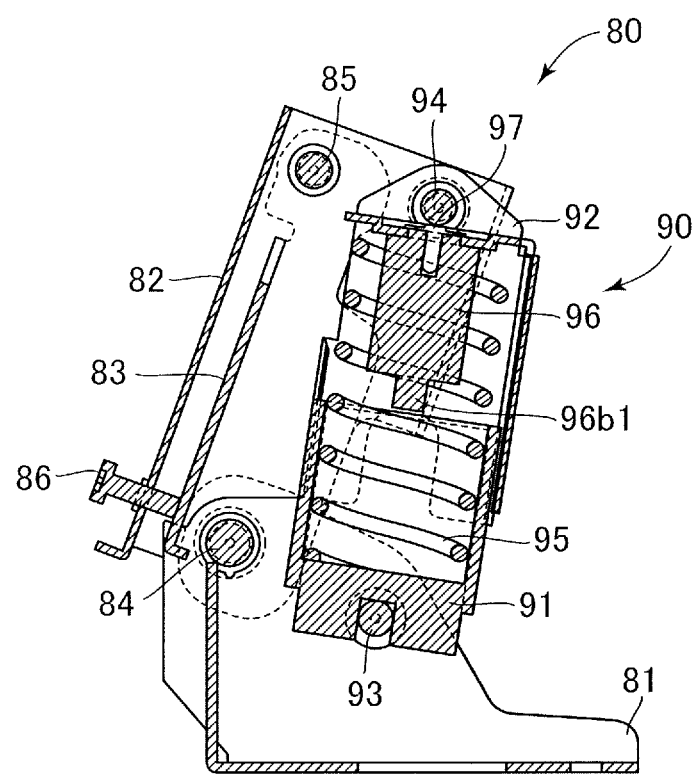
FIG. 4 is a left section view of the image reading apparatus illustrating a structure of an opening/closing unit on the left.

Next, a configuration of an opening/closing device 50, which is configured to support the ADF serving as the sheet conveying portion with respect to the image reading portion, of the ADF 30 will be described in detail. As illustrated in FIG. 3, the opening/closing device 50 includes a pair of opening/closing units 60 and 80 on the left and on the right on the rear side in a front-rear direction of the image reading apparatus 3, which is a Y direction in FIG. 3 equivalent to a main-scanning direction. Among the pair of left and right opening/closing units 60 and 80, the right opening/closing unit 80 includes a hinge base 81 fixed to the image reading portion 20, a hinge frame 82 fixed to the ADF 30, and a hinge arm 83 collectively constituting a hinge mechanism as illustrated in FIG. 4. Further, as a result of the hinge frame 82 being configured to be pivotable with respect to the hinge base 81 about a pivot shaft 84 serving as a second pivot shaft, the ADF 30 is supported so as to be pivotable about an axis of the pivot shaft 84 with respect to the image reading portion 20.

In addition, a first end portion of the hinge arm 83 described above is attached to the hinge base 81 so as to be pivotable about the pivot shaft 84, and a second end portion thereof is provided with a lift shaft 85 pivotably supporting the hinge frame 82. Further, an end portion of the hinge frame 82 on the opposite side to the lift shaft 85 is provided with a height adjustment screw 86. A tip end of the height adjustment screw 86 is in contact with the hinge arm 83, and the hinge frame 82 can be pivoted about the lift shaft 85 with respect to the hinge arm 83 by advancing and retracting the height adjustment screw 86. Further, as a result of configuring the hinge frame 82 to be pivotable with respect to the hinge arm 83, the height of the ADF 30 with respect to the document feeding-reading glass 38 can be adjusted.

Further, the opening/closing unit 80 includes an opening/closing assistance unit 90 that assists an opening/closing operation of the ADF 30 between the hinge base 81 and the hinge frame 82. This opening/closing assistance unit 90 includes a slider 91 pivotably attached to the hinge base 81 via a case support shaft 93, and a hinge case 92 pivotably attached to the hinge frame 82 via a torque shaft 94. The slider 91 and the hinge case 92 are engaged with each other so as to be relatively slidable in accordance with opening/closing of the ADF 30, and a compression spring 95 and an oil damper 96 are interposed between the slider 91 and the hinge case 92. The compression spring 95 serves as a second urging member configured to generate a torque around the axis in a direction in which the sheet conveyance portion moves from a closed position toward an opened position.

Figure 5:
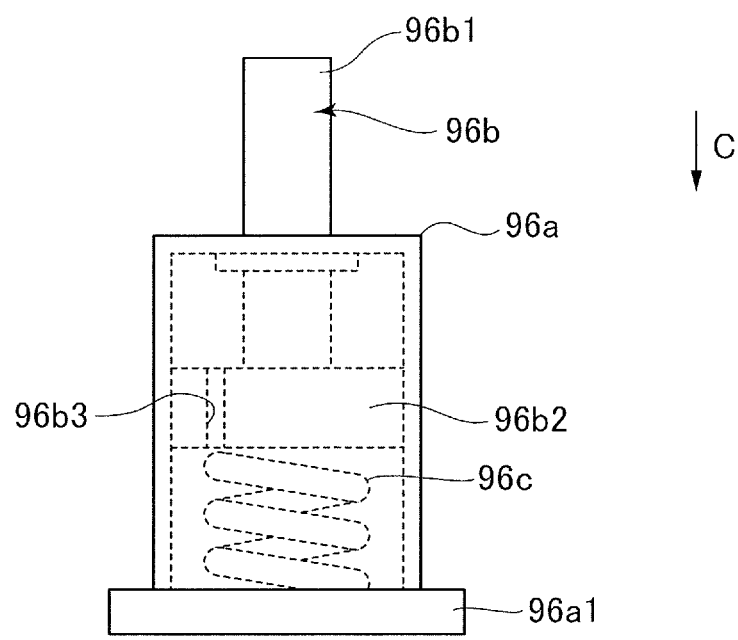
FIG. 5 is a schematic diagram illustrating a structure of an attenuation device.

More specifically, a first end portion of the compression spring 95 serving as an urging member is held by the hinge case 92, a second end portion thereof is held by the slider 91, and thus the compression spring 95 is compressed between the hinge case 92 and the slider 91. In addition, the oil damper 96 is fixed to the hinge case 92 by an oil damper fixing spring 97. As illustrated in FIG. 5, the oil damper 96 includes a damper case 96a filled with an oil and a damper slider 96b. A first end portion of the damper slider 96b is a contact portion 96b1 that projects from the damper case 96a and comes into contact with the slider 91, and a second end portion of the damper slider 96b is a piston portion 96b2 that slides inside the damper case 96a. In addition, a damper spring 96c is compressed in an oil chamber on the opposite side to the contact portion 96b1 with the piston portion 96b2 interposed therebetween in the damper case 96a. Further, a port 96b3 is defined in the piston portion 96b2, and oil chambers in the damper case 96a partitioned by the piston portion 96b2 communicate with each other through the port 96b3. When the damper slider 96b is pressed by the slider 91 and moves in a C direction, the elastic force of the damper spring 96c and a resistance force of an oil passing through the port 96b3 generates an attenuation force.

In the case of opening the ADF 30 from a closed position to an opened position, the opening/closing assistance unit 90 generates, by an urging force of the compression spring 95, a hinge torque in a direction in which the ADF 30 moves from the closed position to the opened position, and thus assists an opening operation of the ADF 30 performed by a user. In addition, in the case of closing the ADF 30 from the opened position to the closed position, the descending speed of the ADF 30 derived from the weight thereof is reduced by the resistance force of the compression spring 95 and the oil damper 96, and thus the ADF 30 is supported so as to be closed slowly.

Figure 6:
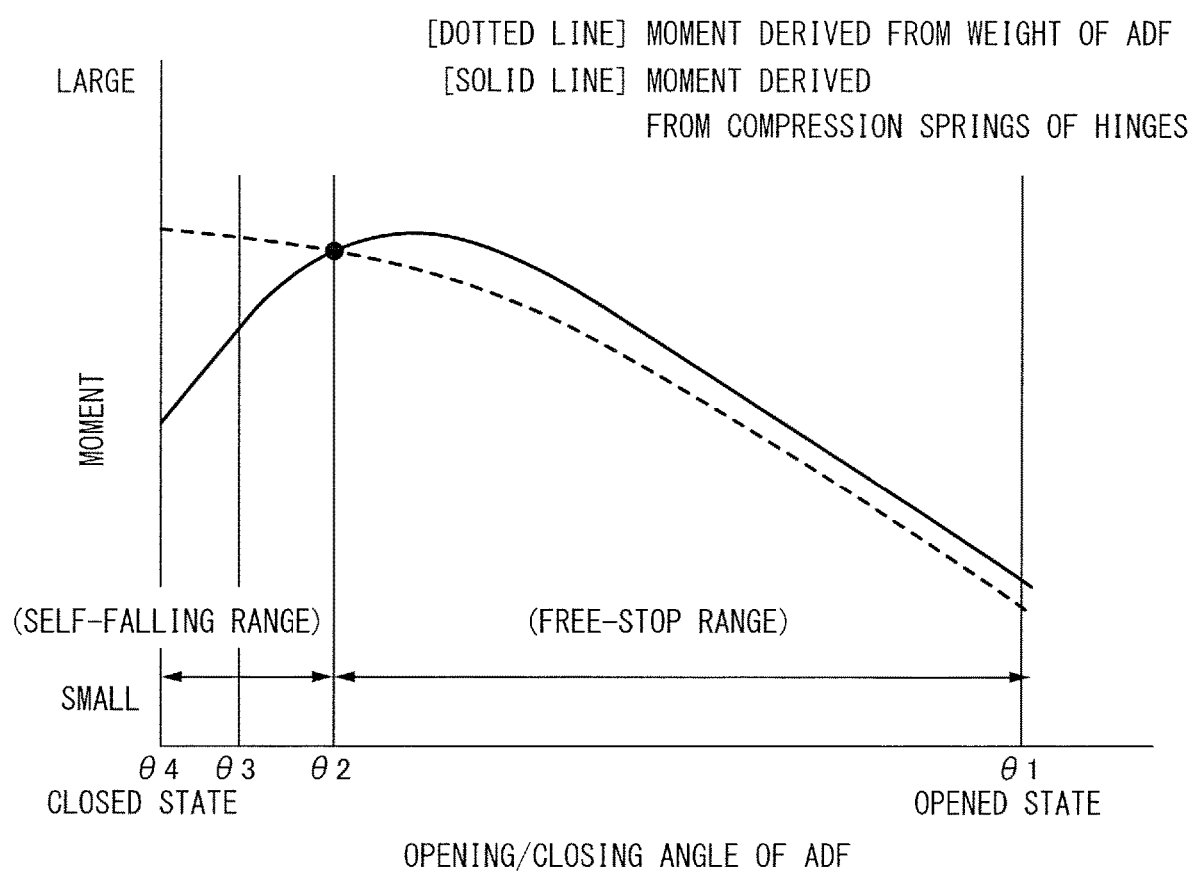
FIG. 6 is a graph illustrating a relationship between an opening/closing angle and a moment of the ADF.

FIG. 6 illustrates a relationship between an opening/closing angle and a moment of the ADF 30. A solid line represents a moment derived from a compression spring of an opening/closing device, that is, a hinge, and a dotted line represents a moment derived from the weight of the ADF 30. Here, as illustrated in FIG. 7, in the case where an opening/closing angle $\theta$ is $\theta 1$ among opening/closing angles $\theta 1$ to $\theta 4$ of FIG. 6, the slider 91 has moved most in a B direction, and, in this case, the contact portion 96b1 of the damper slider 96b is separated from the slider 91.

Figure 7:
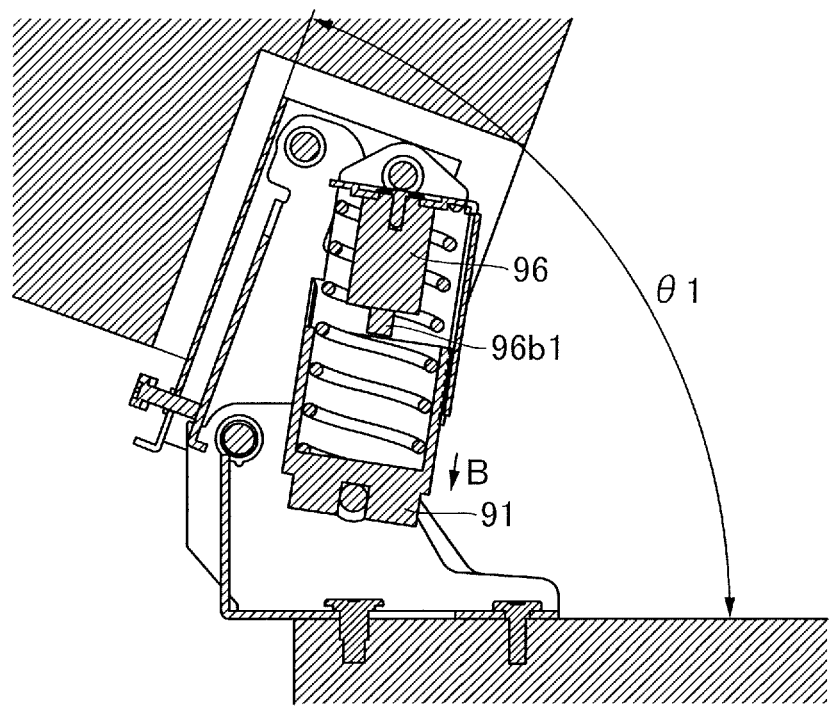
FIG. 7 is a schematic diagram illustrating the opening/closing unit when an opening/closing angle θ is θ1.
Figure 8:
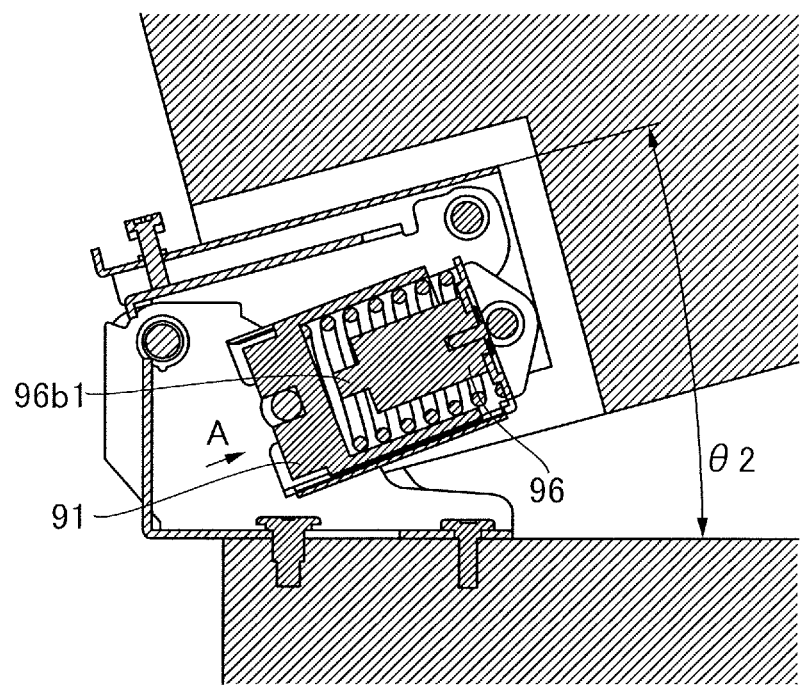
FIG. 8 is a schematic diagram illustrating the opening/closing unit when the opening/closing angle θ is θ2.

As illustrated in FIG. 8, a state in which the opening/closing angle $\theta$ is $\theta 2$ is a state in which the slider 91 has moved in an A direction from the state of FIG. 7, and, in this state, the contact portion 96b1 of the damper slider 96b is separated from the slider 91. When the ADF 30 is closed to such a degree that the opening/closing angle is smaller than $\theta 2$, that is, $\theta < \theta 2$ holds, the moment about the pivot shaft derived from the weight of the ADF 30 becomes greater than the moment about the pivot shafts derived from the urging force of the compression springs of the left and right opening/closing units 60 and 80. Therefore, the ADF 30 takes a self-falling state of being automatically closed by the weight thereof.

In contrast, in a range where the opening/closing angle $\theta$ satisfies $\theta 2 < \theta \leq \theta 1$, the moment about the pivot shafts derived from the weight of the ADF 30 becomes smaller than the moment about the pivot shaft derived from the urging force of the compression springs of the left and right opening/closing units 60 and 80. Therefore, combined with friction in sliding portions of the opening/closing units 60 and 80, the ADF 30 takes a free-stop state in which the opening/closing angle thereof is maintained.

Figure 9:
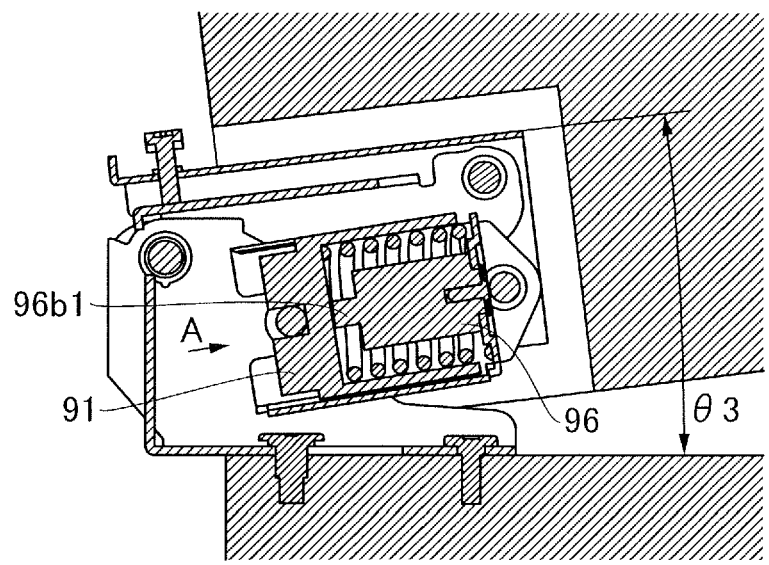
FIG. 9 is a schematic diagram illustrating the opening/closing unit when the opening/closing angle θ is θ3.

As illustrated in FIG. 9, a state in which the opening/closing angle $\theta$ is $\theta 3$ is a state in which the slider 91 has moved further in the A direction from the state of FIG. 8, and, in this state, the contact portion 96b1 of the damper slider 96b is in contact with the slider 91. That is, the oil damper 96 starts operating in the state of the opening/closing angle $\theta = \theta 3$, and a resistance force in a direction opposite to the direction in which the ADF 30 is closed starts being generated as an effect of the oil damper 96 at a position of the opening/closing angle $\theta = \theta 3$. Therefore, the descending speed of the ADF 30 is reduced, and the ADF 30 is softly landed.

Figure 10:
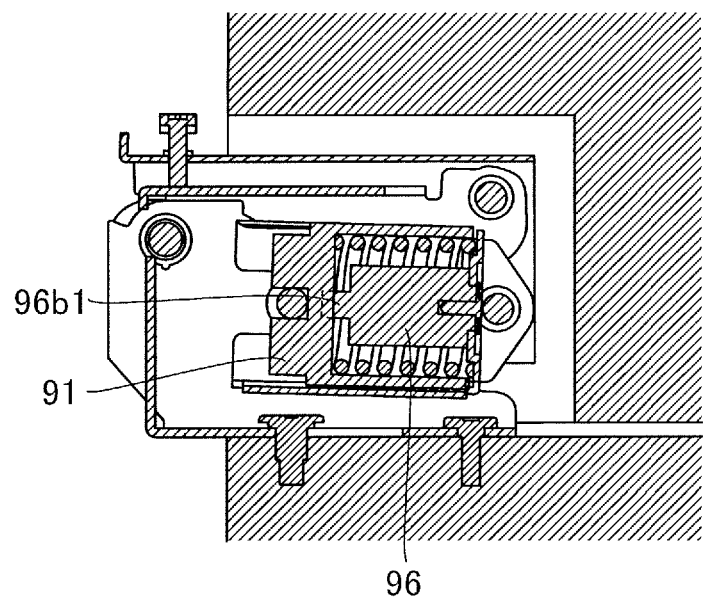
FIG. 10 is a schematic diagram illustrating the opening/closing unit when the opening/closing angle θ is θ4.

A state in which the opening/closing angle $\theta$ is $\theta 4$ is a state in which the ADF 30 is in a closed position, that is, the opening/closing angle $\theta$ is 0° as illustrated in FIG. 10, and the slider 91 has further moved in the A direction from the state of FIG. 9. To be noted, in the case of opening the ADF 30 from this closed position, the damper slider 96b is just in contact with the slider 91 and thus no resistance force is generated. That is, the oil damper 96 operates only when closing the ADF 30.

Configuration of Left Opening/Closing Unit

Figure 11:
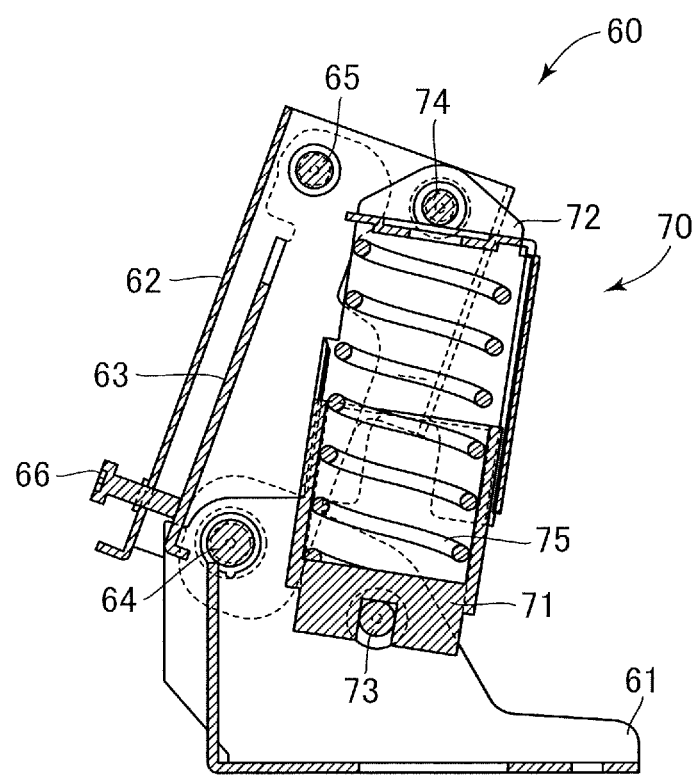
FIG. 11 is a left section view of the image reading apparatus illustrating a structure of an opening/closing unit on the right.

Next, a configuration of the left opening/closing unit 60 serving as a first support portion will be described in detail. As illustrated in FIG. 11, the left opening/closing unit 60 includes, similarly to the right opening/closing unit 80, a hinge base 61 fixed to the image reading portion 20, a hinge frame 62 fixed to the ADF 30, and a hinge arm 63 collectively constituting a hinge mechanism. Further, as a result of the hinge frame 62 being configured to be pivotable with respect to the hinge base 61 about a pivot shaft 64 serving as a first pivot shaft, the ADF 30 is supported so as to be pivotable with respect to the image reading portion 20.

In addition, a first end portion of the hinge arm 63 described above is attached to the hinge base 61 so as to be pivotable about the pivot shaft 64, and a second end portion thereof is provided with a lift shaft 65 pivotably supporting the hinge frame 62. Further, an end portion of the hinge frame 62 on the opposite side to the lift shaft 65 is provided with a height adjustment screw 66. A tip end of the height adjustment screw 66 is in contact with the hinge arm 63, and the hinge frame 62 can be pivoted about the lift shaft 65 with respect to the hinge arm 63 by advancing and retracting the height adjustment screw 66. Further, as a result of configuring the hinge frame 62 to be pivotable with respect to the hinge arm 63, the height of the ADF 30 with respect to the document feeding-reading glass 38 can be adjusted.

Further, the opening/closing unit 60 includes an opening/closing assistance unit 70 that assists an opening/closing operation of the ADF 30 between the hinge base 61 and the hinge frame 62. This opening/closing assistance unit 70 includes a slider 71 pivotably attached to the hinge base 61 via a case support shaft 73, and a hinge case 72 pivotably attached to the hinge frame 62 via a torque shaft 74. The slider 71 and the hinge case 72 are engaged with each other so as to be relatively slidable in accordance with opening/closing of the ADF 30, and a compression spring 75 is interposed between the slider 71 and the hinge case 72. The compression spring 75 serves as a first urging member configured to generate a torque around the axis in a direction in which the sheet conveyance portion moves from a closed position toward an opened position.

Difference Between Left and Right Opening/Closing Units

Next, difference in configuration between the left and right opening/closing units 60 and 80 will be described. As illustrated in FIG. 2, in the ADF 30, rollers and drive sources that drive the rollers are concentrated in the vicinity of the document reading portion, and thus many structures are present in the vicinity of the document reading portion. As a result of this, a position 30G of a center of gravity of the ADF 30 is on the document reading portion side as illustrated in FIG. 3. More specifically, the center-of-gravity position 30G of the ADF 30 is positioned further on the rear side than a center position 30C of the ADF in the front-rear direction of the ADF 30. In addition, the center-of-gravity position 30G is positioned further on the left opening/closing unit 60 side serving as a first opening/closing unit side than the center position 30C of the ADF 30 in a left-right direction of the ADF 30, which is the X direction in the drawings and equivalent to the sub-scanning direction.

Therefore, the urging force, that is, the spring force or the spring coefficient of the compression spring 75 of the left opening/closing unit 60 is set to be larger than that of the compression spring 95 of the right opening/closing unit 80 serving as a second support portion. In addition, hinge torque about the pivot shafts 64 and 84 generated in the left and right opening/closing units 60 and 80 by the urging force of the compression springs 75 and 95 is stronger in the left opening/closing unit 60 closer to the center of gravity and weaker in the right opening/closing unit 80 farther from the center of gravity. That is, the compression spring 75 as the first urging member is configured to have a greater urging force than the compression spring 95 as the second urging member.

In addition, since an oil damper that applies a resistance force against pivot about a pivot axis of the ADF 30 and absorbs vibration energy of the ADF 30 is expensive, the oil damper is attached to only one of the left and right opening/closing units 60 and 80 of the opening/closing device 50. More specifically, in the present exemplary embodiment, the oil damper is attached to only the right opening/closing unit 80, and is not attached to the left opening/closing unit 60. The reason why the oil damper 96 is attached to only the right opening/closing unit 80 will be described below.

The rigidity of the ADF 30 is designed so as not to affect the reading accuracy because the reading accuracy of an image is affected in the case where the ADF 30 is deformed by the resistance force of the hinge torque and cannot land on the document feeding-reading glass 38 or the platen glass 21. Specifically, in the present exemplary embodiment, the ADF 30 is formed such that the rigidity thereof is higher on the left side that receives a greater resistance force from an opening/closing unit.

Here, when the ADF 30 falls by its own weight and is thus closed, the right side thereof having a lower rigidity vibrates more than the left side thereof having a higher rigidity. That is, an impact force generated when the ADF 30 collides with the image reading portion 20 is greater on the right side of the ADF 30 having a lower rigidity than on the left side of the ADF 30 having a higher rigidity. Therefore, by not providing the left opening/closing unit 60 with an oil damper and providing only the right opening/closing unit 80 with the oil damper 96, the impact force at the time of landing of the ADF 30 can be effectively reduced while reducing the production cost of the image reading apparatus 3.

Table 1 below shows measurement results of impact values when the ADF 30 falls by its own weight in a state in which an acceleration meter is attached to a front end portion of the ADF 30 in the front-rear direction at the center thereof in the left-right direction while changing conditions concerning presence/absence of a damper. As can be seen from Table 1, the impact value is smallest in an example in which an oil damper is provided in each of the left and right opening/closing units 60 and 80, second smallest in an example in which an oil damper is provided in only the right opening/closing unit 80, and third smallest in an example in which an oil damper is provided in only the left opening/closing unit 60.

TABLE 1

|  | Damper | | |
| --- | --- | --- | --- |
| Left opening/closing unit | Provided | Not provided | Provided |
| Right opening/closing unit | Provided | Provided | Not provided |
| Impact value (G) | 0.94 | 2.99 | 6.85 |
|  | 0.90 | 2.91 | 5.03 |
|  | 0.90 | 3.14 | 5.39 |
| Average | 0.91 | 3.01 | 5.76 |

As described above, by employing a configuration in which the oil damper 96 is provided only in the right opening/closing unit 80, the impact force at the time of landing of the ADF 30 can be effectively reduced in a good balance with the production cost of the image reading apparatus 3. In addition, since only the right opening/closing unit 80 is provided with the oil damper 96 serving as an attenuation device, a risk of occurrence of a trouble such as oil leakage can be reduced as compared with a case where each of the left and right opening/closing units 60 and 80 is provided with an oil damper.

To be noted, the left opening/closing unit 60 can be referred to as a first opening/closing unit provided at a position in a first distance L1 from the reading position 24 in a movement direction of the carriage 22e serving as a movable portion, which corresponds to the sub-scanning direction and the left-right direction, as illustrated in FIG. 3. In addition, the right opening/closing unit 80 can be referred to as a second opening/closing unit provided at a position in a second distance L2 longer than the first distance L1 from the reading position 24 in the movement direction. In the present exemplary embodiment, the movement direction of the carriage 22e mentioned herein corresponds to a direction along the axis of the pivot shafts 64 and 84. That is, the first opening/closing unit 60 comprises a first support portion configured to support the sheet conveyance portion 30 such that the sheet conveyance portion 30 is pivotable about an axis with respect to the image reading portion 20. The second opening/closing unit 80 comprises a second support portion configured to support the sheet conveyance portion 30 such that the sheet conveyance portion 30 is pivotable about the axis with respect to the image reading portion 20. Then, the second support portion being provided in a position different from the first support portion in a direction along the axis, and a distance between the reading position 24 and the first support portion in the direction along the axis is shorter than a distance between the reading position 24 and the second support portion in the direction along the axis.

Further, from a different perspective, the left opening/closing unit 60 can be referred to as a first opening/closing unit provided at a position in a third distance L3 from the center-of-gravity position 30G of the ADF 30 serving as a sheet conveyance portion in the movement direction of the carriage 22e. In addition, the right opening/closing unit 80 can be referred to as a second opening/closing unit provided at a position in a fourth distance L4 longer than the third distance L3 from the center-of-gravity position 30G in the movement direction.

In addition, the left opening/closing unit 60 can be referred to as a first opening/closing unit including the first pivot shaft 64 and the first urging member 75 configured to generate a torque in the first pivot shaft 64 and in a direction in which the ADF 30 moves from a closed position to an opened position. In addition, the right opening/closing unit 80 can be referred to as a second opening closing unit including the second pivot shaft 84 and the second urging member 95 configured to generate, in the second pivot shaft 84 and in the direction in which the ADF 30 moves from the closed position to the opened position, a torque smaller than the torque generated by the first urging member 75. Further, in the present exemplary embodiment, the second opening/closing unit 80 includes the attenuation device 96 configured to attenuate vibration energy of the ADF 30 serving as a sheet conveyance portion, and the first opening/closing unit 60 does not include an attenuation device. To be noted, the first to fourth distances L1 to L4 are each a distance measured on the basis of the center position in the left-right direction of the left and right opening/closing units 60 and 80.

In addition, although the compression springs 75 and 95 of the left and right opening/closing units 60 and 80 are each constituted by one spring in the exemplary embodiment described above, the configuration is not limited to this, and the compression springs 75 and 95 may be each constituted by a plurality of springs. For example, the compression spring of the left opening/closing unit 60 may be constituted by a plurality of springs aligned and connected to have a larger spring coefficient than the compression spring of the right opening/closing unit 80. In addition, the urging members that apply hinge torque to the left and right opening/closing units 60 and 80 may be constituted by any urging members instead of compression springs as long as the urging members can apply torque to the pivot shafts.

Further, although the opening/closing device 50 is constituted by the two opening/closing units 60 and 80 in the present exemplary embodiment, the opening/closing device 50 may be constituted by three or more opening/closing units. In addition, although the left and right opening/closing units 60 and 80 are separately provided on the left side and on the right side with the center position 30C of the ADF 30 therebetween, first and second opening/closing units may be positioned on the same side in the left-right direction with respect to the center position 30C in the case where, for example, three or more opening/closing units are provided.

Further, although an oil damper is used as an attenuation device in the exemplary embodiment described above, the present invention is not limited to this, and any kind of damper device may be used. In addition, any system, for example, a charge-coupled device: CCD system or a contact image sensor: CIS system, may be employed for the optical scanner unit 22, and therefore any image sensor, for example, a CCD or a complementary metal-oxide-semiconductor sensor: CMOS sensor, may be used as the image sensor. In addition, in the case of, for example, the CIS system, this image sensor may be not provided in the carriage serving as a movable portion.

In addition, although the printer 100 of the electrophotographic system has been used for description of the exemplary embodiment, the present invention is not limited to this. For example, the present invention can be also applied to an image forming apparatus of an inkjet system that forms an image on a sheet by ejecting an ink liquid through a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-062948, filed Mar. 28, 2018, which is hereby incorporated by reference herein in its entirety.

What is claimed is:

1. An image reading apparatus comprising:
a sheet conveyance portion configured to convey a sheet;
an image reading portion comprising a movable portion and an image sensor and configured to read an image on the sheet conveyed by the sheet conveyance portion, the movable portion comprising a light source and being movable in a movement direction, the image sensor being configured to photoelectrically convert reflection light emitted from the light and reflected on the sheet;
a first opening/closing unit configured to openably and closeably support the sheet conveyance portion with respect to the image reading portion, the first opening/closing unit being provided at, in the movement direction, a position a first distance from a reading position at which the image on the sheet conveyed by the sheet conveyance portion is read by the image reading portion; and
a second opening/closing unit configured to openably and closeably support the sheet conveyance portion with respect to the image reading portion, the second opening/closing unit being provided at a position a second distance longer than the first distance from the reading position in the movement direction,
wherein the first opening/closing unit comprises a first spring configured to urge the sheet conveyance portion in a direction in which the sheet conveyance portion moves from a closed position toward an opened position,
wherein the second opening/closing unit comprises a second spring configured to urge the sheet conveyance portion in the direction in which the sheet conveyance portion moves from the closed position toward the opened position and an oil damper configured to attenuate vibration energy of the sheet conveyance portion, and
wherein the first opening/closing unit does not comprise an oil damper.

2. The image reading apparatus according to claim 1, wherein the first opening/closing unit is provided at a position in a third distance from a position of a center of gravity of the sheet conveyance portion in the movement direction of the movable portion, and
wherein the second opening/closing unit is provided at a position n a fourth distance longer than the third distance from the position of the center of gravity of the sheet conveyance portion in the movement direction of the movable portion.

3. The image reading apparatus according to claim 2, wherein the position of the center of gravity of the sheet conveyance portion is closer to the first opening/closing unit than a center position of the sheet conveyance portion in the movement direction.

4. The image reading apparatus according to claim 1,
wherein the first spring is configured to have a greater urging force than the second spring.

5. The image reading apparatus according to claim 1,
wherein the first opening/closing unit comprises a first pivot shaft and the first spring [urging member] configured to generate a torque in the first pivot shaft and in the direction in which the sheet conveyance portion moves from the closed position toward the opened position, and
wherein the second opening/closing unit comprises a second pivot shaft, the second spring, and the oil damper, the second spring being configured to generate, in the second pivot shaft and in the direction in which the sheet conveyance portion moves from the closed position toward the opened position, a torque smaller than the torque generated by the first spring, the oil damper being configured to attenuate vibration energy of the sheet conveyance portion.

6. The image reading apparatus according to claim 1,
wherein the first opening/closing unit comprises a first support portion configured to support the sheet conveyance portion such that the sheet conveyance portion is pivotable about an axis with respect to the image reading portion,
wherein the second opening/closing unit comprises a second support portion configured to support the sheet conveyance portion such that the sheet conveyance portion is pivotable about the axis with respect to the image reading portion, the second support portion being provided in a position different from the first support portion in a direction along the axis,
wherein a distance between the reading position and the first support portion in the direction along the axis is shorter than a distance between the reading position and the second support portion in the direction along the axis, and
wherein the oil damper applies a resistance force against pivot of the sheet conveyance portion about the axis.

7. An image forming apparatus comprising:
the image reading apparatus according to claim 1; and
an image forming portion configured to form an image on a sheet on a basis of image information read by the image reading apparatus.

8. An image reading apparatus comprising:
a sheet conveyance portion configured to convey a sheet;
an image reading portion comprising a movable portion and an image sensor and configured to read an image on the sheet conveyed by the sheet conveyance portion, the movable portion comprising a light source and being movable in a movement direction, the image sensor being configured to photoelectrically convert reflection light emitted from the light source and reflected on the sheet; and
a first opening/closing unit configured to openably and closeably support the sheet conveyance portion with respect to the image reading portion,
the first opening/closing unit being provided at, in the movement direction, a position a first distance from a center of gravity of the sheet conveyance portion; and
a second opening/closing unit configured to openably and closeably support the sheet conveyance portion with respect to the image reading portion, the second opening/closing unit being provided at a position a second distance longer than the first distance from the center of gravity in the movement direction,
wherein the first opening/closing unit comprises a first spring configured to urge the sheet conveyance portion in a direction in which the sheet conveyance portion moves from a closed position toward an opened position,
wherein the second opening/closing unit comprises a second spring configured to urge the sheet conveyance portion in a direction in which the sheet conveyance portion moves from the closed position toward the opened position and an oil damper configured to attenuate vibration energy of the sheet conveyance portion, and
wherein the first opening/closing unit does not comprise an oil damper.

9. An image reading apparatus comprising:
a sheet conveyance portion configured to convey a sheet;
an image reading portion configured to read an image on the sheet conveyed by the sheet conveyance portion at a reading position;
a first support portion configured to support the sheet conveyance portion such that the sheet conveyance portion is pivotable about an axis with respect to the image reading portion, the first support portion comprising a first spring configured to urge the sheet conveyance portion in a direction in which the sheet conveyance portion moves from a closed position toward an opened position; and
a second support portion configured to support the sheet conveyance portion such that the sheet conveyance portion is pivotable about the axis with respect to the image reading portion, the second support portion being provided in a position different from the first support portion in a direction along the axis and comprising a second spring configured to urge the sheet conveyance portion in the direction in which the sheet conveyance portion moves from the closed position toward the opened position,
wherein a distance between the reading position and the first support portion in the direction along the axis is shorter than a distance between the reading position and the second support portion in the direction along the axis,
wherein the second support portion comprises an oil damper that applies a resistance force against pivot of the sheet conveyance portion about the axis, and
wherein the first support portion does not comprise an oil damper.

* * * * *